United States Patent
Patil et al.

(10) Patent No.: US 7,271,702 B2
(45) Date of Patent: Sep. 18, 2007

(54) METHOD AND SYSTEM FOR AUTONOMOUS CORRELATION OF SENSED ENVIRONMENTAL ATTRIBUTES WITH ENTITIES

(75) Inventors: Abhishek Patil, Mumbai (IN); Alan George Cole, Katonah, NY (US); Paul Andrew Moskowitz, Yorktown Heights, NY (US); Jonathan Paul Munson, Putnam Valley, NY (US); David Wood, Scarsdale, NY (US); Han Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/948,059

(22) Filed: Sep. 23, 2004

(65) Prior Publication Data

US 2006/0061476 A1   Mar. 23, 2006

(51) Int. Cl.
*H04Q 5/22* (2006.01)
*G05B 19/00* (2006.01)
*G06F 7/00* (2006.01)
*G06K 19/00* (2006.01)
*G08B 29/00* (2006.01)

(52) U.S. Cl. .................... 340/10.42; 340/10.1; 340/5.5

(58) Field of Classification Search ............. 340/10.42, 340/10.1, 5.5, 539, 572.1, 572.8, 825.49; 700/213–214, 245, 258; 701/23; 705/28, 705/213; 180/167

See application file for complete search history.

(56) References Cited

U.S. PATENT DOCUMENTS

| | | | |
|---|---|---|---|
| 5,684,695 A | 11/1997 | Bauer | 364/424 |
| 5,867,800 A * | 2/1999 | Leif | 701/23 |
| 6,364,026 B1 | 4/2002 | Doshay | 169/47 |
| 6,370,452 B1 * | 4/2002 | Pfister | 701/23 |
| 6,496,755 B2 * | 12/2002 | Wallach et al. | 700/245 |
| 6,728,608 B2 | 4/2004 | Ollis et al. | 701/28 |
| 6,977,579 B2 * | 12/2005 | Gilfix et al. | 340/407.1 |
| 7,005,968 B1 * | 2/2006 | Bridgelall | 340/10.42 |
| 2002/0070862 A1 | 6/2002 | Francis et al. | |
| 2004/0164858 A1 | 8/2004 | Lin | |
| 2005/0004702 A1 * | 1/2005 | McDonald | 700/213 |
| 2005/0246248 A1 * | 11/2005 | Vesuna | 705/28 |

OTHER PUBLICATIONS http://ieeexplore.org/xpl/tocresult.jsp?isNumber=27394- 1st International Workshop on Robotice Sensing, 2003. Rose 2003.
http://www.directionsmag.com/editorials.php?article_id=526.
Ni, et al. "LANDMARC: Indoor Location Sensing Using Active RFID," presented at IEEE PerCom, Mar. 2003.
Steggles, P. Et al. "A Comparison of RF Tag Location ;Products for Real-World Applications," Ubisense Mar. 2004.
Hightower, J. et al. "A Survey and Taxonomy of Location Sensing Systems for Ubiquitous Conmputing," University of Washington, Department of Ciomputer Science and Engineering, Seattle, WA, Aug, 2001, CSE 01-08-03.

* cited by examiner

*Primary Examiner*—Brian Zimmerman
*Assistant Examiner*—Nam Nguyen
(74) *Attorney, Agent, or Firm*—Douglas W. Cameron; Anne Vachon Dougherty (57) ABSTRACT

A method for determining attributes of entities within a physical space. More specifically, the location of the entities in the physical space are determined using this invention. A reader automatically moves throughout the space and takes measurements of the attributes of corresponding entities when it detects the presence of these entities in the physical space. The attributes of the entities could be the location, temperature and so forth. The reader could be an RF detection device for reading signals from the tags attached to the entities.

17 Claims, 6 Drawing Sheets

METHOD AND SYSTEM FOR AUTONOMOUS CORRELATION OF SENSED ENVIRONMENTAL ATTRIBUTES WITH ENTITIES

FIELD OF THE INVENTION

This invention relates to automatic recording of the values of an environmental attribute for entities identified with tags, such as RFID or Wi-Fi tags, where the value of the attribute changes from time to time, but its value is not required to be continuously tracked.

BACKGROUND OF THE INVENTION

Consider a typical public library. Each book has its own place in a particular shelf. Readers may take several books (from different shelves) and browse through them till they find the right book. While some readers manage to return the unwanted books to the correct place, many will either not replace the book at all, or will put it back in the wrong place. The latter is hard to detect; to fix this problem, libraries hire people to "read shelves" periodically to find incorrectly filed books. Similar situation exists in many retail stores where the customers can try several items before deciding which one to buy. In many cases, the customer never returns the tested item to its correct shelf and again, store personnel must spend time putting items back in their correct place. Some kind of automated tracking mechanism would be very useful. The problem of asset tracking is not restricted to libraries or retail stores. Many companies are realizing the importance of increasing the visibility within their supply chain. Asset tracking—knowing what you have and where it is located—is essential for the smooth operation of large manufacturing companies. It also helps big retailers isolate bottlenecks in their supply chain, reduce overstocking or locate spoiled cargo. Similarly, government and military organizations are interested in cheaper (and more efficient) ways to track their assets and equipment.

Automatic location sensing is a key in enabling such tracking applications. One of the best-known location-based systems is GPS, which relies on satellites to track location. However, due to the dependence on low-power satellite signals, GPS is difficult or impossible to use inside buildings to determine location. So, in order to achieve location tracking inside buildings, researchers and industry have proposed several systems that differ with respect to technology used, accuracy, coverage, frequency of updates and the cost of installation and maintenance. Triangulation, scene analysis, and proximity are some of the principal techniques for automatic location-sensing. Many of the current location sensing systems are radio based (Wi-Fi, Bluetooth, ZigBee, UWB). By using base station visibility and signal strength or time of flight, it is possible to locate Wi-Fi devices with an accuracy of several meters. In many situations, however, it is prohibitively expensive to continuously track an item. Continuous tracking may be used in scenarios where the items in question have high value or are of great importance (for example military equipment, jewelry boxes, etc.), thus justifying the cost. However, for many applications (e.g. tracking inventory) a periodic (say nightly) recording of location is sufficient.

In recent years, RFID technology has attracted considerable attention. RFID is emerging as an important technology that is reshaping the functioning of supply chain management. RFID not only replaces the old barcode technology but also provides a greater degree of flexibility in terms of range and access mechanisms. For example, an RFID scanner can read the encoded information even if the tag is concealed for either aesthetic or security reasons. Various companies and governmental agencies are proposing to use RFID for identifying large lots of goods at the pallet and carton level. Usually passive tags (that is, those without their own power source) are preferred for tagging goods as they are much cheaper, long lived, lightweight and have a smaller foot print. However since passive tags work without a battery, they also have a very small detection range and hence are not normally used in location sensing system that are purely RFID-based. Active tags, with their own batteries, have a much greater detection range and might be used as part of a positioning system, but these tags are currently too expensive for wide-spread deployment. What is lacking is an efficient and economical means of detecting the location of the passive tags. Our invention addresses this need.

SUMMARY OF THE INVENTION

The embodiment of the system of this invention described hereinafter combines (passive) RFID technology and a Wi-Fi (Wireless Fidelity) based continuous location positioning system to provide a periodic asset location sweep. Although this embodiment uses Wi-Fi based location positioning, other embodiments of the system of the invention can work with any continuous positioning technology. The embodiment described herein not only identifies but also provides location information of every RFID-tagged item in the sweep space. A portable system (e.g. laptop or PDA) running a Wi-Fi client and connected to an RF reader is mounted on a robot that moves autonomously through the space. As the robot moves, the RF reader periodically samples which tags are detectable. At each sample time, the robot's position is obtained from the positioning system. An algorithm is then applied to combine the detected tags' readings with their previous samples to compute an estimated current location for each tag.

Wi-Fi is a registered trademark of the Wi-Fi Alliance.

More specifically, an aspect of this invention combines a tag reader (of an RFID tag, for example), a sensor of some environmental attribute (for example, location or temperature), and a computing device together with a robotic device that is able to travel autonomously through a specified area. The computing device is equipped with at least one of a wireless communications device and a local storage device. Entities (for example, pallets or cases) in the space have tags mounted on them. The distance at which tags can be detected by the tag reader is limited by physical constraints (for example, the effective range of a passive RFID tag reader depends on antenna design, reader power levels, and other physical factors).

As the robot travels through the specified area, its tag reader detects nearby tags. At the same time, the sensor device obtains readings of the environmental attribute (e.g., location or temperature). These items of information are combined, and either sent by the wireless communications device to a master computing device, or stored locally for later processing (or both).

This information is processed by at least one of several algorithms specified herein. The result is the automatic and autonomous assignment of a value of the environmental attribute to each of the tagged entities in the specified area (for example, the temperature of each case, or the location of each pallet).

BRIEF DESCRIPTION OF THE DRAWINGS

The features of the present invention will become more apparent from the following detailed description, taken in conjunction with the accompanying drawings in which.

DETAILED DESCRIPTION OF THE INVENTION

An embodiment of the system of the invention is described in which the environmental attribute being sensed is location. Based on this description, other embodiments of the system of the invention are easily imagined in which the environmental attribute being measured is something other than location. Examples include temperature, noise level, brightness, humidity, and velocity.

Figure 1:
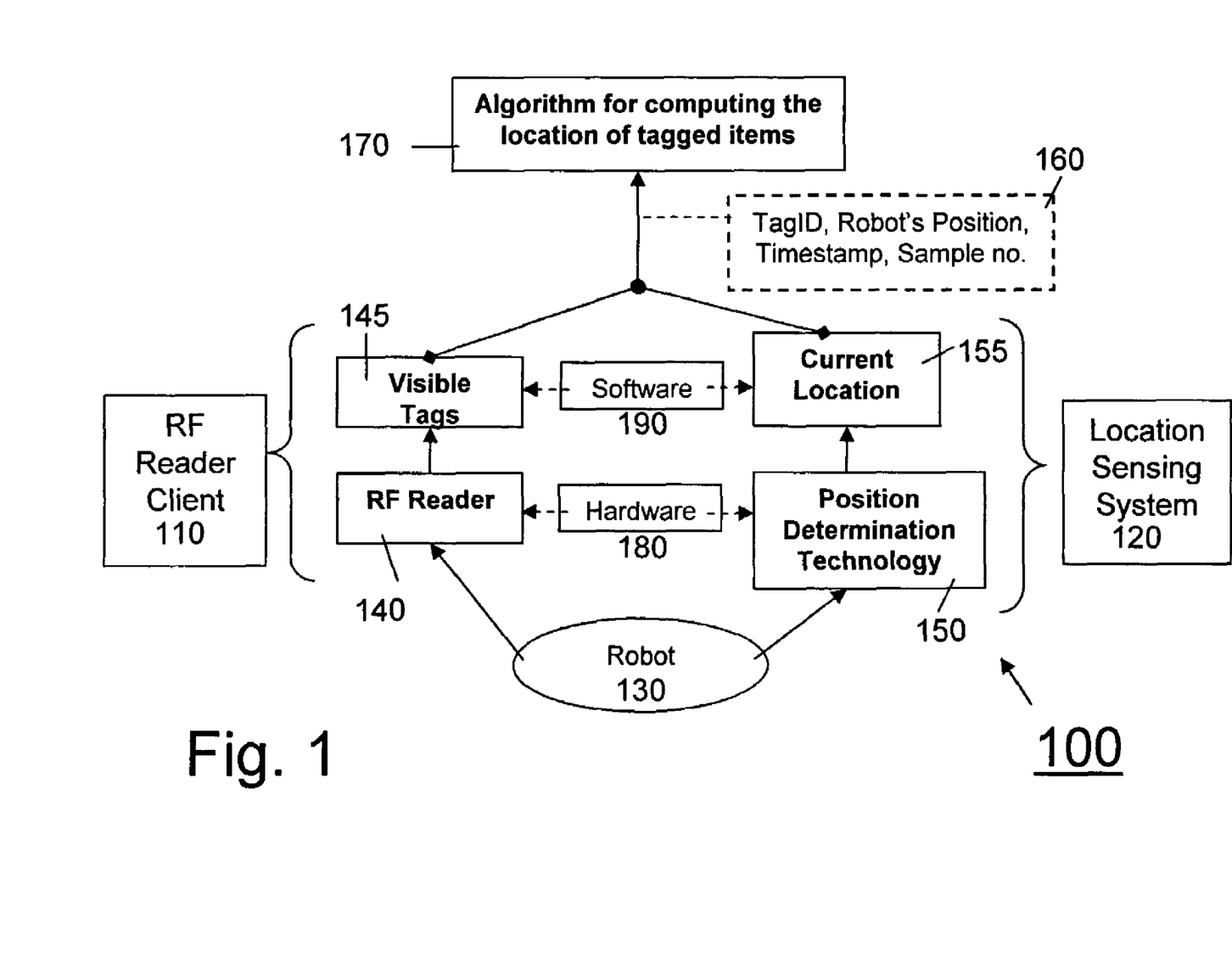
FIG. 1 graphically illustrates the logical arrangement of the system of this invention.

FIG. 1 gives a logical flow chart of the system of the invention 100. A robot 130 travels autonomously through a designated area. It is equipped with an RF tag reader 140, by means of which RF reader client software 110 is able to detect nearby tags 145. At the same time a position determination sensor 150 enables location sensing software 120 to determine the present location 155 of the robot 130. The information from the tag 145 and the current location 155 are combined into a detection record 160 associating this information. An algorithm 170 then uses one or more detection records 160 for a single tag to compute an estimated location for that tag.

Figure 2:
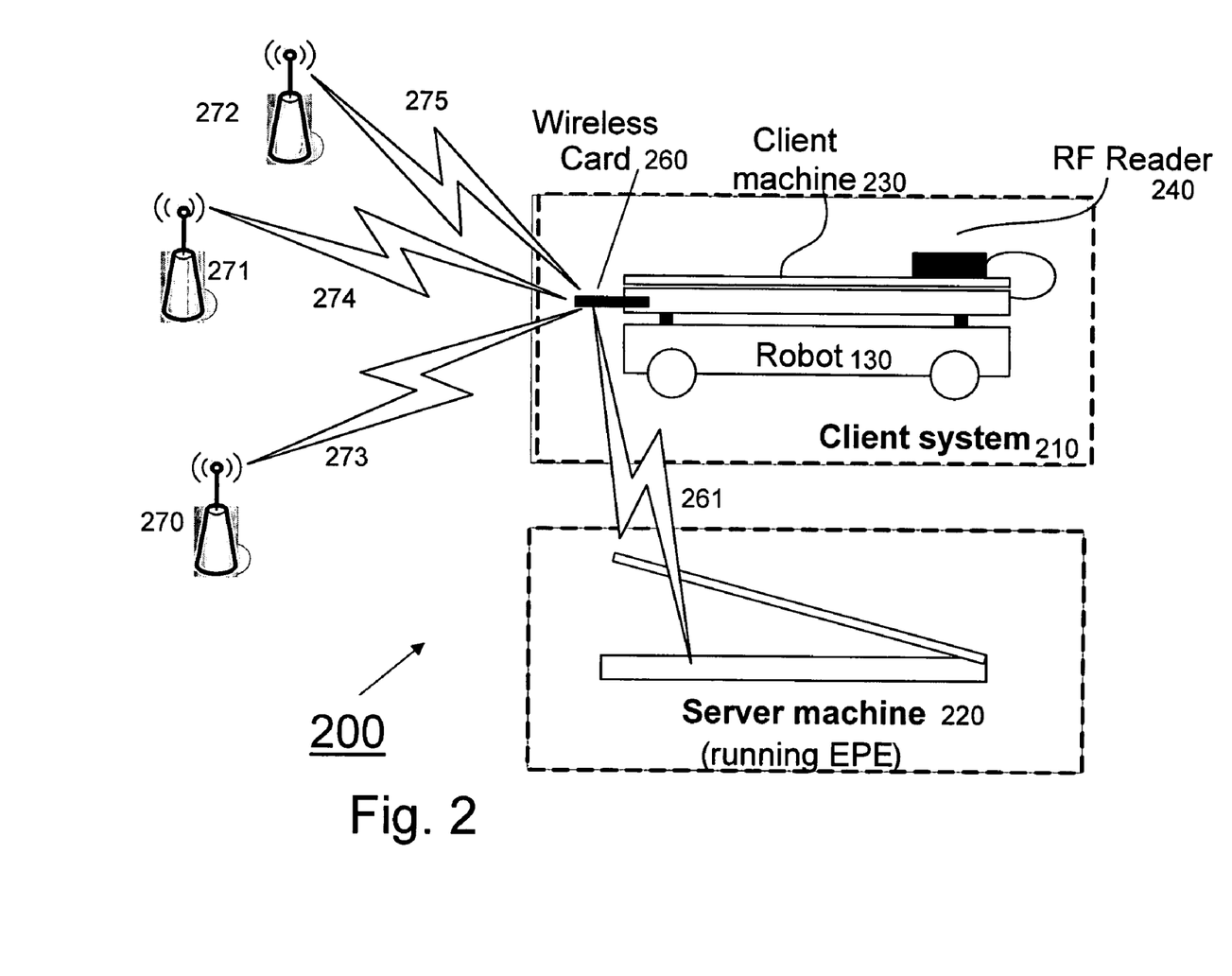
FIG. 2 graphically illustrates the physical arrangement of an embodiment of the invention.

FIG. 2 gives a physical description of one embodiment of the system of the invention 200. The robot 130 in this embodiment is the Roomba Robotic Floorvac, a cleaning device which moves autonomously in the sweep space, using intelligent navigation technology to automatically move around a room or other specified area without human direction. A probabilistic algorithm guarantees that a high percentage of the space will be covered. In this embodiment, a computing device 230, an RF tag reader 240, and a wireless communications device 260 are all attached to the robot and, together, comprise the client system 210.

In this embodiment, the location is measured by the Ekahau Positioning Engine (EPE), which uses the signal strengths of the wireless access points 270, 271, and 272 as measured at the wireless card 260 to estimate the position of the client system 210. It also provides a statistical error estimate. When an RF tag is detected by the RF reader 240, the estimated location of the client system 210 at that moment is combined with the tag information to produce a detection record 160 (FIG. 1). This detection record is sent by the wireless card 260 over a wireless communications link 261 to a master server machine 220, which processes the detection records with an algorithm 170 (FIG. 1) to compute an estimated location for the tag. In the current embodiment, the server machine 220 is used both to run the Ekahau Positioning Engine (EPE) and also to process the detection records, but in other embodiments, these two functions might be located on separate computing devices; alternatively, all the computing functions might be combined into the single robot-mounted computing device 230.

Figure 3:
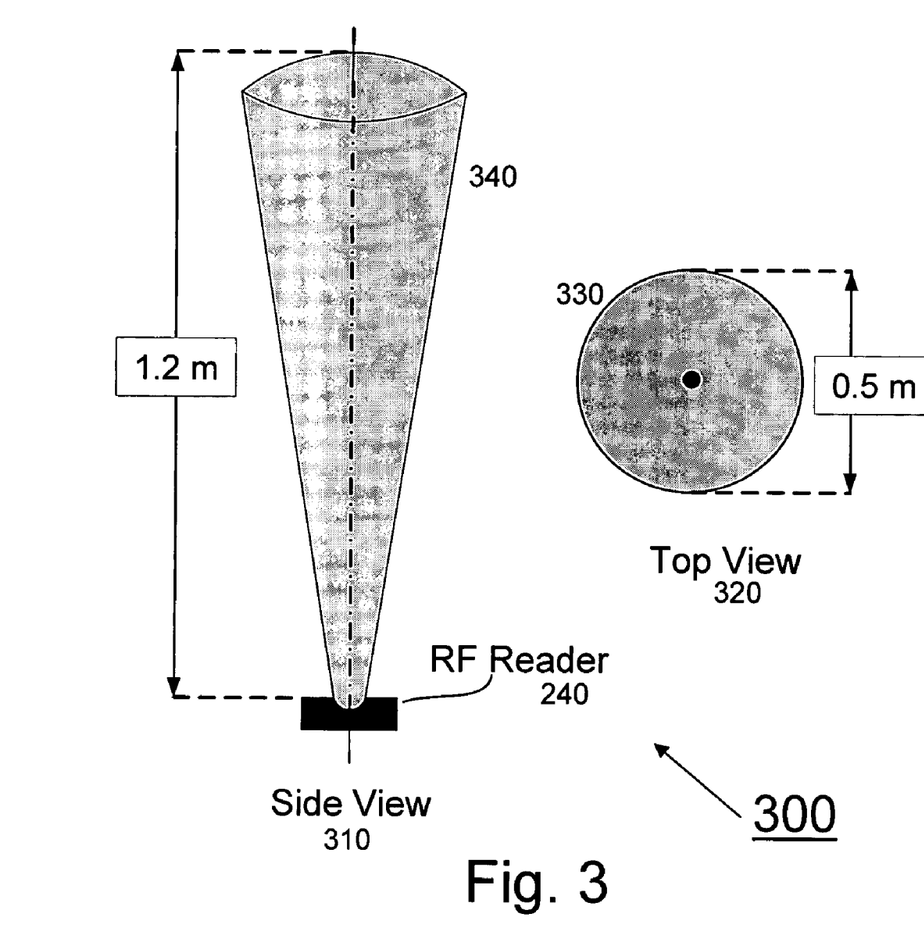
FIG. 3 shows the RF characteristics of the RFID tag reader.

In experiments conducted with the current embodiment of the system of the invention, RF tags were placed as shown in FIG. 3, at about 1.2 m above the level of the RF reader 240, which was mounted on the robot on the floor. The antenna on the RF reader was oriented upward, so that it was able to detect signals within a cone 310 which had a diameter of approximately 0.5 m at a height of 1.2 m as shown in the top view 320. Thus, in these experiments with the current embodiment, when an RF tag was detected by the robot-mounted RF reader, its position was known to be within plus or minus 0.25 m of the reader's location (and at a height of 1.2 m, fixed in this experiment). This information is used in the algorithms described later.

Figure 4:
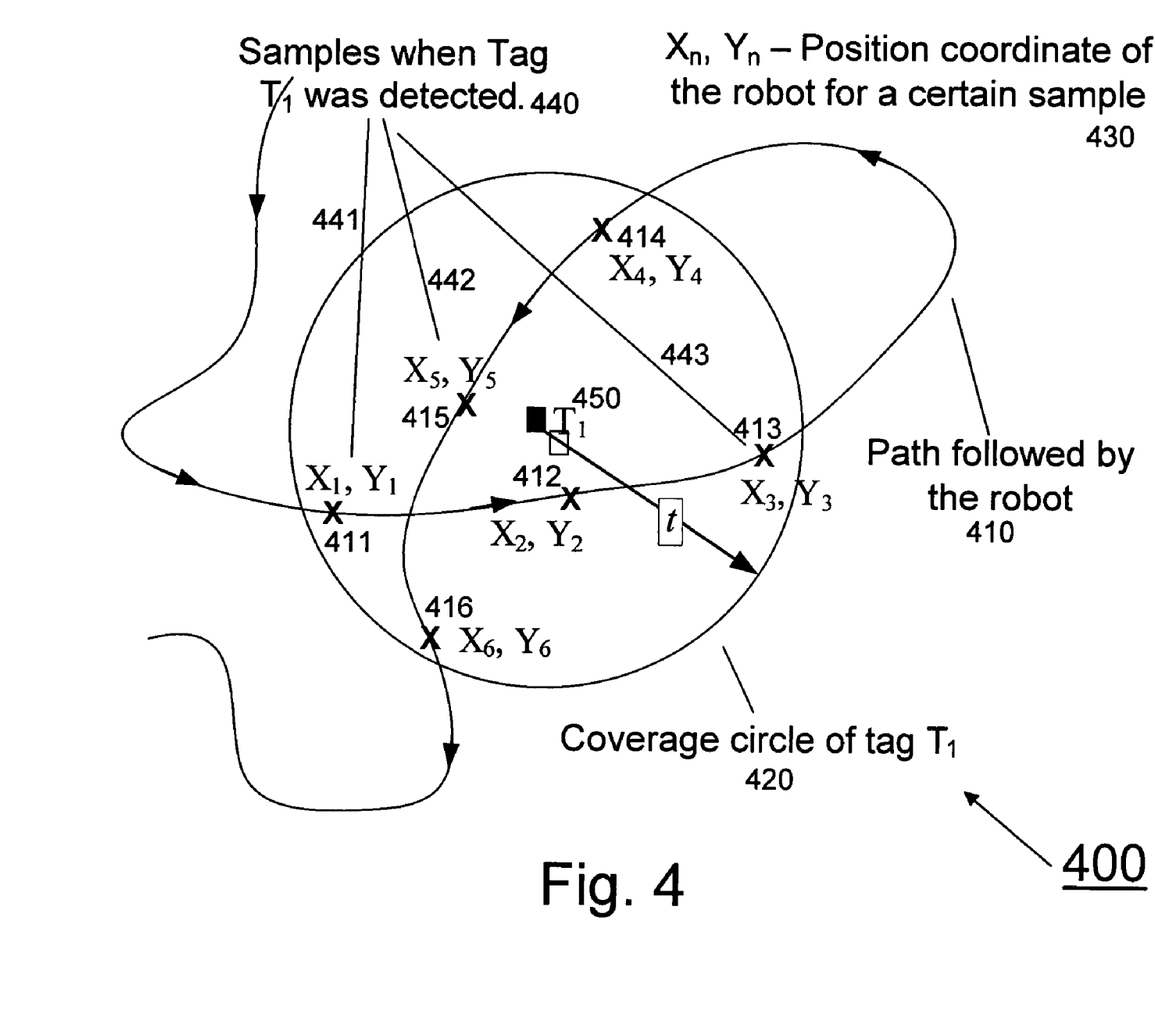
FIG. 4 graphically illustrates an example of a random path followed by the robot, with an RFID tag being detected at several points along this path.

FIG. 4 shows a schematic diagram of the operation of the system 400. The RF tag 450 can be detected within a limited area described by the circle 420. As the robot follows a random path 410 through the designated area, the tag 450 will be detected whenever the reader is within the circle 420 and tries to make a reading. The tag is detected at numerous points 411, 412, 413, 414, 415, 416, each of which is within the circle 420 and on the robot's path 410. At each of these points, a measurement 440 will be taken of the estimated current position of the robot, and combined with the identification of the RF tag 450 to produce a detection record for each such point.

Centroid Algorithm

The location sensing technology used in the current embodiment provides (X, Y) coordinates together with an error estimate ee. As explained earlier, the RF reader's detection circle has a diameter of about 0.5 m (for the RF tags used in this embodiment, which were placed at a height of approximately 1.2 m above the RF reader). A circle drawn with center at (X, Y) and radius (R) of ee+r (where r is the radius of the tag's coverage circle) will include the tag being tracked. We call this circle the confidence circle. Intersection of several such confidence circles provides a finer estimate of a tag's position. We represent the tag's location as the centroid of this intersection area.

Figure 5:
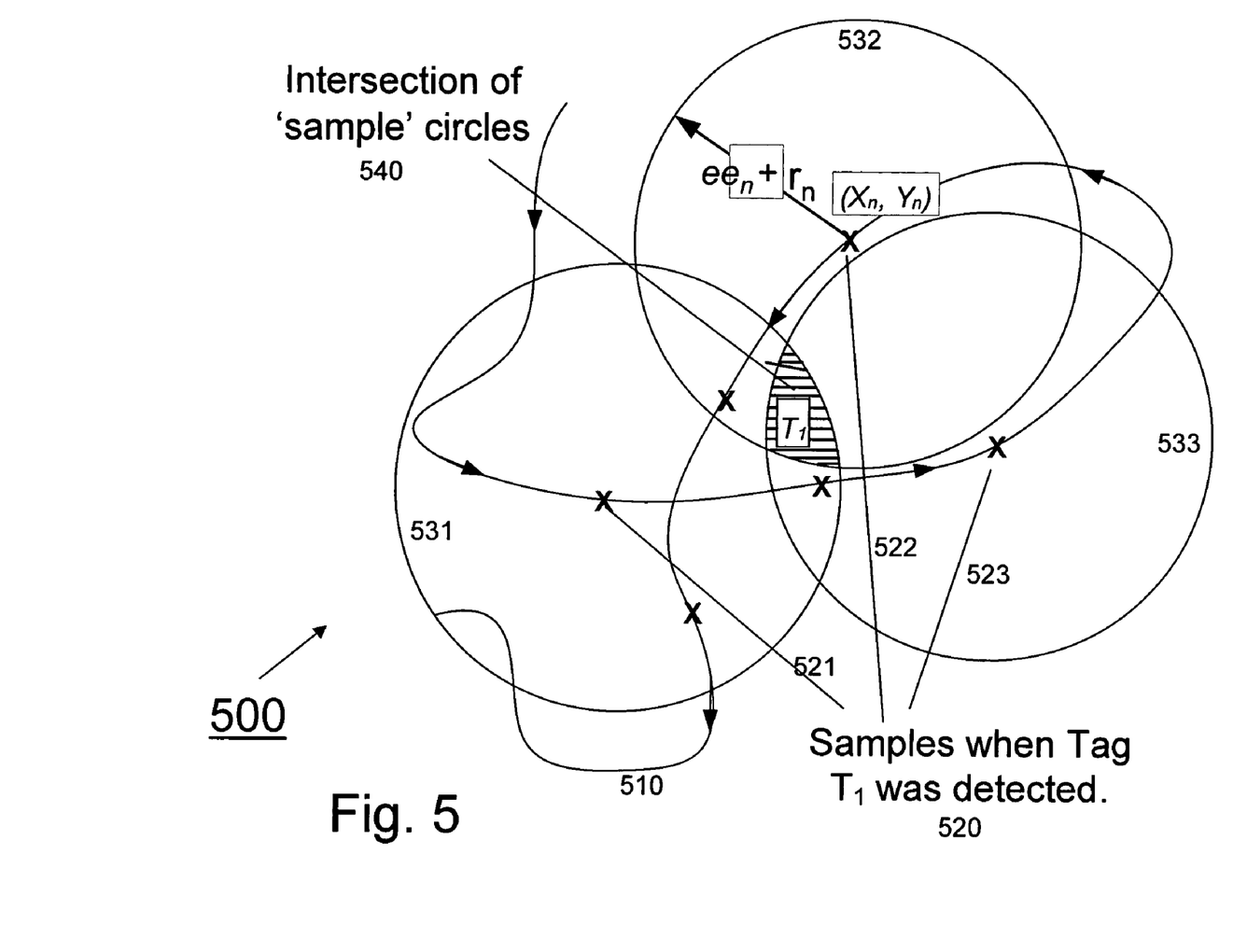
FIG. 5 graphically illustrates an example of the centroid algorithm.

FIG. 5 shows an example of this calculation 500. As the robot travels the random path 510, it senses the tag $T_1$ at a number of points 521, 522, 523, and so on. At each such point, the confidence circle is computed, resulting in circles 531, 532, and 533, as well as any other circles resulting from other samples. Since the tag $T_1$ must be within the interior of each such circle, it follows that it must be within the intersection of these circles 540. Observe that, in general, this estimate will be more precise than that provided by any one of the confidence circles, and, as the number of samples increases, the intersection area will generally decrease, thus improving the accuracy of the tag's calculated position.

$$R_n = ee_n + r_n$$

$$\text{Tag } (X_t, Y_t) = \text{centroid } \{C[(X_1, Y_1)R_1] \cap C[(X_2, Y_2) R_2] \cap \ldots \cap C[(X_n, Y_n)R_n]\}$$

$(X_1, Y_1)$ through $(X_n, Y_n)$ represent locations of the reader at which the tag is detected, while $(X_t, Y_t)$ represents the estimated location of the tag, which is estimated to be within the intersection of the circles $C[(X_1, Y_1)R_1]$ through $C[(X_n, Y_n)R_n]$.

Weighted Averages

An algorithm that computes the location coordinates of the tagged entity as a weighted average of the reader's locations when it detected the entity. The weight of each location estimate is inversely proportional to the square of the error radius.

$$\text{Tag}(X_t, Y_t) = [\Sigma\{1/e_i^2 * (X_i, Y_i)\}]/(\Sigma 1/e_i^2)$$

Plain Averages

An algorithm that computes the location coordinates of the tagged entity as the statistical average of the reader's location when it detected the entity.

$$\text{Tag }(X_t, Y_t) = [\Sigma(X_i, Y_i)]/\{\text{no. of samples}\}$$

Figure 6:
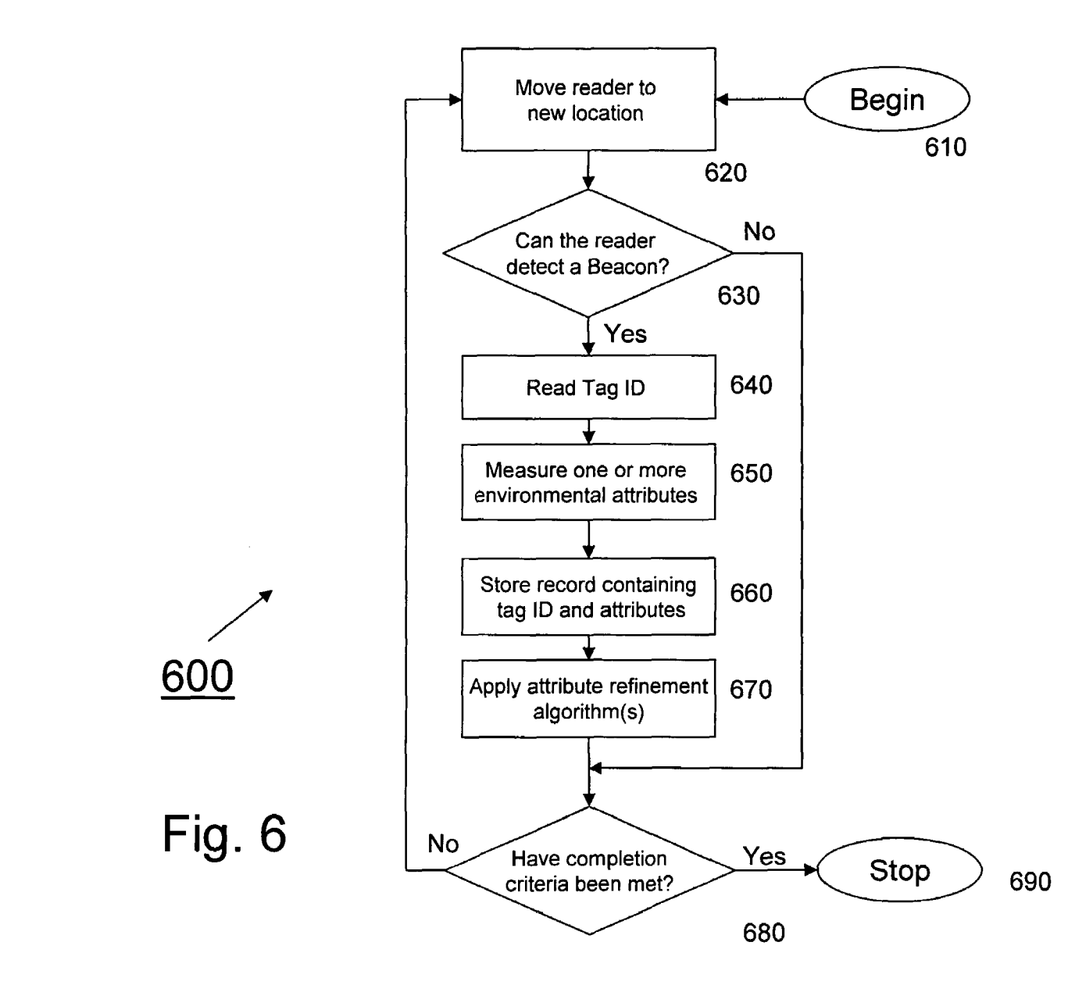
FIG. 6 is a flowchart illustrating the operation of a system in accordance with the invention.

FIG. 6 shows a flowchart of the system of the invention 600. The system, when it begins its periodic sweep of the specified area, moves from the start state 610 to the state 620, in which the robot autonomously moves to a new location. The decision is then made 630 whether the tag reader is able to detect one or more tags. If not, the system enters state 680 as described below.

When the tag reader detects a tag, the procedure described in 640 is followed and the tag ID is read from the detected tag. If multiple tags are detected, the ID is read from each. The system then proceeds to carry out the procedure described in 650 to read the environmental attribute or attributes of interest (e.g., location, temperature, noise level, and so on).

The values of the environmental attributes are then combined with the tag ID read in step 640, and the combined record is stored as in step 660. If multiple tags were detected, then each is separately combined with the environmental attribute or attributes measured, and each record is stored separately. In the present embodiment of the system of the invention, the records are sent over a wireless communications link to a separate server computing device and stored there, but in other embodiments, the records may also be stored locally.

In step 670, one of the algorithms described above is applied to the records for each tag in order to compute a new estimated value for the environmental attribute of the tag (e.g., the tag's estimated location, temperature, the estimated noise level at the tag, and so on).

Finally, step 680 tests whether a stopping criterion has been met. If so, the robot enters the stopped state 690 and the sweep of the space is complete. But if not, the robot then re-enters state 620 and moves to a new location, where the whole process begins over again. A variety of stopping criteria may be used. In the current embodiment of the system of the invention, the manufacturer of the robotic vacuum cleaner has used as a stopping criterion the length of time it has been running. A user, in starting the robot, selects a small, medium, or large room. It runs a short time for a small space, and a long time for a large space, with the running time calculated to produce a high probability of covering 90% or more of the space. An additional capability allows the robot to run as long as its battery lasts. But other stopping criteria are possible in other embodiments, such as running until the average error estimate is below some threshold, or running until a known number of tags are detected, or of using a more intelligent navigation technology to direct the movements of the robot until all areas of the space are covered.

What is claimed is:

1. A computer-implemented method for determining a corresponding attribute for each of a plurality of entities within a physical space, said method comprising:
   detecting the presence of entities in said physical space by detecting the presence of beaconing devices associated with said entities using a reader which automatically moves throughout said space;
   taking measurements of a variable in response to the detection of the presence of any of said entities in said physical space as said reader moves in said space; and
   processing said measurements of said variable, wherein each of corresponding set of said processed measurements represents a corresponding attribute of a corresponding one of said entities, said processing comprising using an algorithm that is automatically applied to said measurements using a computer processor, wherein said algorithm comprises taking a weighted average of positions of the reader as moves in said physical space, where the weight of each position is inversely proportional to the second power of the reader location estimate's error radius.

2. A method as recited in claim 1, wherein said variable is a location of a reader, which is used to detect the presence of said entities.

3. A method as recited in claim 1, wherein said corresponding attribute is a location of a corresponding one of said entities.

4. A method as recited in claim 1, wherein said reader automatically moves in said space by attaching it to a robot which is programmed to automatically move in said space.

5. A method as recited in claim 1, wherein the identity of any of said beaconing devices and a corresponding value of said variable is recorded in a detection record for a corresponding one of said entities when said any of said beaconing devices is detected in said space.

6. A method as recited in claim 1, wherein said entities are at least one of the following: museum exhibits, cars in a parking lot, inventory items in a warehouse, shipping containers in a port facility, people within a meeting space, animals within an enclosure, and books within a library.

7. A system for determining a corresponding attribute for each of a plurality of entities within a physical space, said system comprising:
   a beaconing device associated with each of said entities;
   a reader which automatically moves throughout said space, said reader for detecting the presence of any one of said beaconing devices associated with a corresponding one of said entities;
   a measuring device for measuring a variable in response to the detection of the presence of any of said entities in said physical space as said reader moves in said space; and
   a processor for processing said measurements of said variable, wherein each of corresponding set of said processed measurements represents a corresponding attribute of a corresponding one of said entities, said processing comprising using an algorithm that is automatically applied to said measurements using a computer processor, wherein said algorithm comprises taking a weighted average of positions of the reader as moves in said physical space, where the weight of each position is inversely proportional to the second power of the reader location estimate's error radius.

8. A system as recited in claim 7, wherein said beaconing device is an RFID tag.

9. A system as recited in claim 7, wherein said measuring device is an RFID tag reader.

10. A system as recited in claim 9, wherein said reader is attached to a robot which is programmed to automatically move in said physical space.

11. A system as recited in claim 7, wherein said measuring device is a bar code reader.

12. A system as recited in claim 7, wherein said attribute of a corresponding one of said entities is the location of said entity.

13. A system as recited in claim 7, wherein said variable is the location of said measuring device.

14. A system as recited in claim 7, wherein said measuring device is at least one of the following: a triangulation apparatus, and a pulse delay triangulation apparatus.

15. A computer-implemented method for determining a corresponding location for each of a plurality of entities within a physical space, said method comprising:
   detecting the presence of entities in said physical space by detecting the presence of beaconing devices associated with said entities using a reader which automatically moves throughout said space;
   taking measurements corresponding to a location of said reader in response to the detection of the presence of any of said entities in said physical space as said reader moves in said space; and
   processing said measurements, wherein each of corresponding set of said processed measurements represents a corresponding location of a corresponding one of said entities, wherein said processing comprises computing a weighted average of locations of said reader when a corresponding entity was detected in said space and wherein said weighted average is computed by using a corresponding inverse square of an error radius about said reader for each weight factor for each location.

16. A method as recited in claim 15, wherein said step of taking measurements comprises measuring signal strengths from wireless access points in said space and wherein said signal strength measurements are processed to determine a corresponding location of said reader and to then determine locations of corresponding entities in said space.

17. A method as recited in claim 16, wherein said step of taking measurements is repeated for a number of different locations of said reader as it moves in said space, wherein said measurements for said different locations are further processed to more accurately determine said corresponding locations of said entities in said space.

* * * * *